United States Patent
Lee et al.

(10) Patent No.: US 9,875,178 B2
(45) Date of Patent: Jan. 23, 2018

(54) METHOD AND APPARATUS FOR CONTROLLING CACHE MEMORY

(71) Applicant: SAMSUNG ELECTRONICS CO., LTD., Suwon-si, Gyeonggi-do (KR)

(72) Inventors: Won-chang Lee, Seongnam-si (KR); Do-hyung Kim, Hwaseong-si (KR); Si-hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 268 days.

(21) Appl. No.: 14/496,559

(22) Filed: Sep. 25, 2014

(65) Prior Publication Data

US 2015/0095545 A1    Apr. 2, 2015

(30) Foreign Application Priority Data

Sep. 27, 2013  (KR) .................. 10-2013-0115715

(51) Int. Cl.
*G06F 12/02*    (2006.01)
*G06F 12/0855*  (2016.01)
*G06F 12/0875*  (2016.01)
*G06T 1/60*     (2006.01)

(52) U.S. Cl.
CPC ...... *G06F 12/0215* (2013.01); *G06F 12/0859* (2013.01); *G06F 12/0875* (2013.01); *G06T 1/60* (2013.01); *G06F 2212/455* (2013.01)

(58) Field of Classification Search
CPC .................................................. G06F 12/0862
See application file for complete search history.

(56) References Cited

U.S. PATENT DOCUMENTS

| | | | |
|---|---|---|---|
| 6,378,046 B1* | 4/2002 | Bellers | G09G 5/14 711/133 |
| 7,334,088 B2 | 2/2008 | Franaszek | |
| 2002/0062409 A1 | 5/2002 | Lasserre et al. | |
| 2003/0225976 A1 | 12/2003 | Hokenek et al. | |
| 2004/0143706 A1* | 7/2004 | Johns | G06F 12/128 711/128 |
| 2004/0160960 A1* | 8/2004 | Monta | H04N 21/23406 370/395.4 |
| 2011/0072171 A1 | 3/2011 | Suba et al. | |
| 2012/0233405 A1* | 9/2012 | Budagavi | G06F 12/0844 711/118 |
| 2012/0324172 A1* | 12/2012 | Rabinovitch | G06F 12/121 711/136 |

FOREIGN PATENT DOCUMENTS

KR    10-2005-0069934    7/2005

* cited by examiner

*Primary Examiner* — Ryan Bertram
(74) *Attorney, Agent, or Firm* — Staas & Halsey LLP

(57) ABSTRACT

A method of controlling a cache memory includes receiving location information of one piece of data included in a data block and size information of the data block; mapping the data block onto cache memory by using the location information and the size information; and selecting at least one unit cache out of unit caches included in the cache memory based on the mapping result.

16 Claims, 6 Drawing Sheets

(a)

(b)

METHOD AND APPARATUS FOR CONTROLLING CACHE MEMORY

CROSS-REFERENCE TO RELATED APPLICATIONS

This application claims the priority benefit of Korean Patent Application No. 10-2013-0115715, filed on Sep. 27, 2013, in the Korean Intellectual Property Office, the disclosure of which is incorporated herein in its entirety by reference.

BACKGROUND

1. Field

One or more embodiments of the present invention relate to a method of controlling a cache memory and an apparatus for performing the method.

2. Description of the Related Art

A coding or decoding technology of full high definition (FHD) or ultra high definition (UD) images is increasingly in demand as image-related technology improves. Accordingly, a technology of a processor handling the image in more detail is required. For example, when the image is processed by a method such as motion compensation (MC), a situation may happen where the processor repetitively requests transmission of previously-used data which is stored in a main memory. Then, previously transmitted data is transmitted again to the processor and the overhead due to accessing the main memory highly increases.

A cache memory is located between the processor and the main memory, and operates much faster than the main memory even though the size of the cache memory is smaller than that of the main memory. Thus, when a data requested for transmission exists in the cache memory, use of the cache memory may increase data processing speed since the data may be used by reading out the cache memory without accessing the main memory.

SUMMARY

Additional aspects and/or advantages will be set forth in part in the description which follows and, in part, will be apparent from the description, or may be learned by practice of the invention.

One or more embodiments of the present invention include a method of controlling a cache memory and an apparatus for performing the method.

In addition, embodiments of the present invention can also be implemented through a computer-readable recording medium on which computer-executable programs are recorded. Additional aspects will be set forth in part in the description which follows and, in part, will be apparent from the description, or may be learned by practice of the present embodiments.

Additional aspects will be set forth in part in the description which follows and, in part, will be apparent from the description, or may be learned by practice of the presented embodiments.

According to one or more embodiments of the present invention, a method to control the cache memory includes receiving the location information of a data contained in data block and the size information of data block; mapping data block onto the cache memory using the location information and the size information; and selecting at least one unit cache out of unit caches contained in the cache memory based on the mapping result.

According to one or more embodiments of the present invention, a non-transitory computer-readable recording medium includes a recording medium on which a computer-executable program to control the cache memory described above is recorded.

According to one or more embodiments of the present invention, an apparatus to control the cache memory includes a receiving unit configured to receive the location information of a data contained in data block and the size information of data block; a mapping unit configured to map data block onto the cache memory using the location information and the size information; and the selection unit configured to select at least one unit cache out of unit caches contained in the cache memory based on the mapping result.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
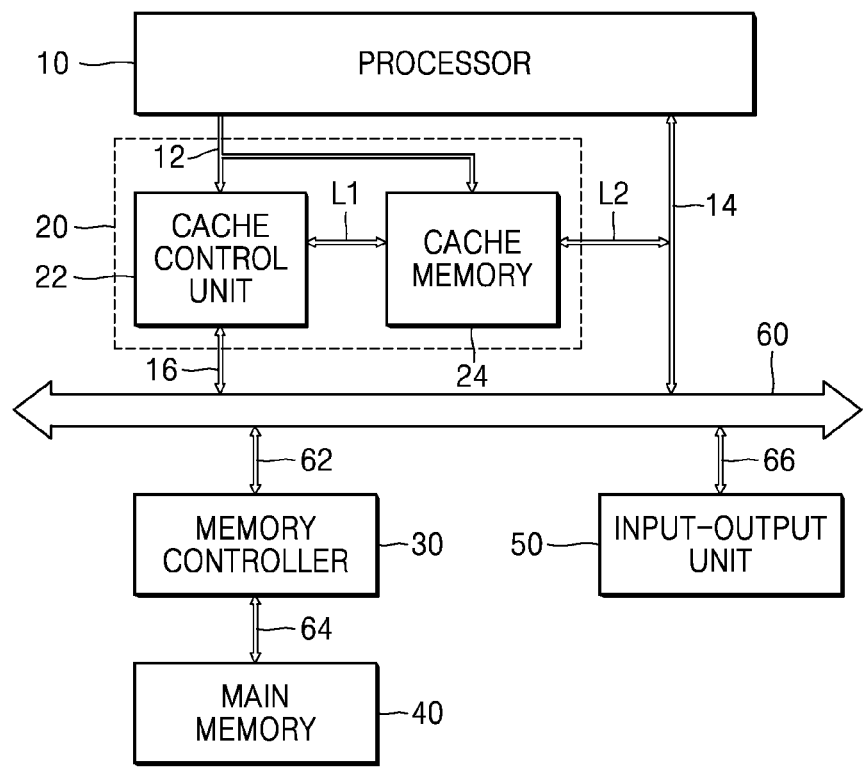
FIG. 1 is a block diagram of an apparatus to control data, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Descriptions of well-known functions and constructions are omitted for clarity and conciseness.

FIG. 1 is a block diagram of an apparatus to control data, according to an embodiment.

Referring to FIG. 1, the apparatus to control data includes a processor 10, a cache memory system 20, a memory controller 30, and a main memory 40. In the apparatus to control data, illustrated in FIG. 1, only components relevant to present embodiments are illustrated. Thus, it will be understood by those of ordinary skill in the art that other conventional components may be further included in addition to the components illustrated in FIG. 1.

Also, it will be understood by those of ordinary skill in the art that the processor 10, the cache memory system 20, the memory controller 30, and the main memory 40 of the apparatus to control data, illustrated in FIG. 1, may exist as independent components.

The cache memory system 20 includes a cache control unit 22 and a cache memory 24. Here, the cache memory 24 may be either L1 or L2 cache, but is not limited hereto.

A line 16 of the cache control unit 22 and a data line 14 of the processor 10 are connected to a system bus 60. The memory controller 30, which is connected through the bus system 60 and a line 62, controls the main memory 40 according to a command of the processor 10. An input-output unit 50 for performing data input-output movement may be connected to the system bus 60 through a line 66.

The processor 10 accesses the cache memory 24 in advance before accessing the main memory 40 when the processor 10 performs data processing operation. Here, an order of either addressing or controlling is authorized to the cache control unit 22 and the cache memory 24 through a line 12.

When data requested by the processor 10 exists in the cache memory 24, an operation is performed according to a cache-hit. In this case, data output from the cache memory 24 flows through the line 12 and the line 14 in sequence, and is transmitted to the processor 10. The reason why the processor 10 accesses the cache memory 24 before the main memory 40 is that a portion of data of the main memory 40, which is repetitively used, is stored in the cache memory 24 by the processor 10. Here, the cache memory system 20 conventionally includes a tag memory storing tag information. The tag information indicates data indicating an address of data stored in the cache memory 24.

When data required by the processor 10 is not stored in the cache memory 24, an operation is performed according to a cache-miss. In this case, the processor 10 controls the memory controller 30 through the system bus 60. Accordingly the main memory 40 is accessed, and data output from the main memory 40 is moved to the data line 14 through the system bus 60.

As described above, when the cache memory system 20 is included in the apparatus to control data, the processor 10 does not need to access the main memory 40 in the case of the cache-hit, and thus, the processor 10 may receive required data at a faster speed. However, in case of the cache-miss, the processor 10 needs to access the main memory 40 and stores required data in the cache memory 24, and then goes through receiving data stored in the cache memory 24, which largely increases the overhead due to storing data in the cache memory 24.

According to an embodiment of the present invention, the cache control unit 22 identifies whether a cache-miss occurs beforehand and requests cache-miss data from the main memory 40 in advance. Thus, the apparatus for processing data may minimize the overhead due to a delay in data transmission and increase a data processing speed.

Figure 2:
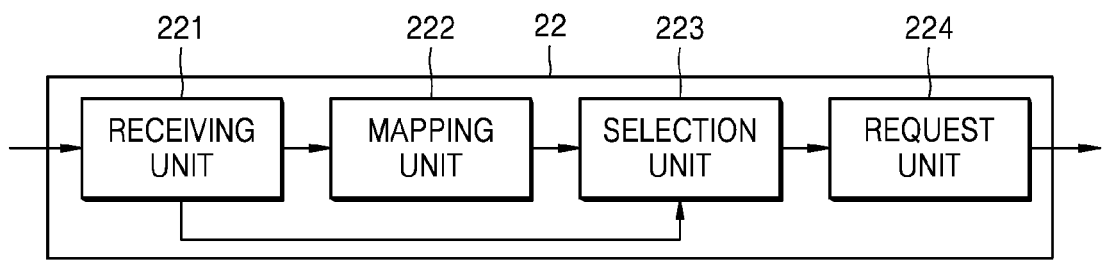
FIG. 2 is a block diagram of a cache control unit according to an embodiment.

FIG. 2 is a block diagram of the cache control unit 22 according to an embodiment.

Referring to FIG. 2, the cache control unit 22 includes a receiving unit (receiver) 221, a mapping unit (mapper) 222, a selection unit (selector) 223, and a request unit (requester) 224. In the cache control unit 22 illustrated in FIG. 2 only components relevant to present embodiments are illustrated. Thus, it will be understood by those of ordinary skill in the art that other conventional components may be further included in addition to the components illustrated in FIG. 2.

Also, it will be understood by those of ordinary skill in the art that the receiving unit 221, the mapping unit 222, the selection unit 223, and the request unit 224 of the cache control unit 22, illustrated in FIG. 2, may individually exist as independent components.

The receiving unit 221 receives location information of data contained in a data block and size information of the data block. Here, the data block indicates a block including data which the processor 10 requests the cache memory 24 to transmit. The cache memory 24 may include one-dimensional line cache or two-dimensional block cache, but is not limited hereto. The data block and the cache memory 24 are described in detail below with reference to FIG. 3.

Figure 3:
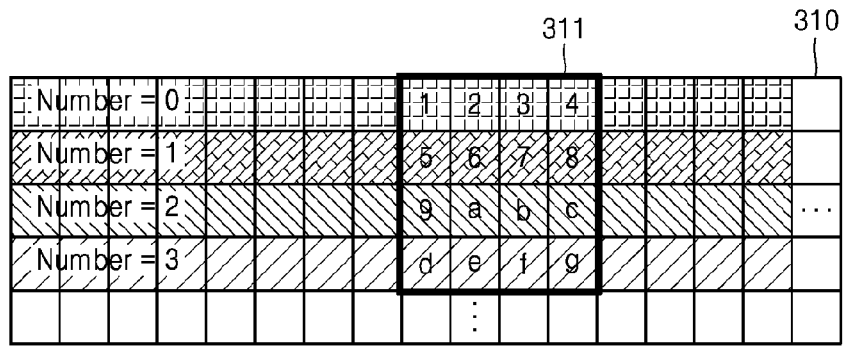
FIG. 3 is a diagram illustrating a data block and a cache memory according to an embodiment.
Figure 3:
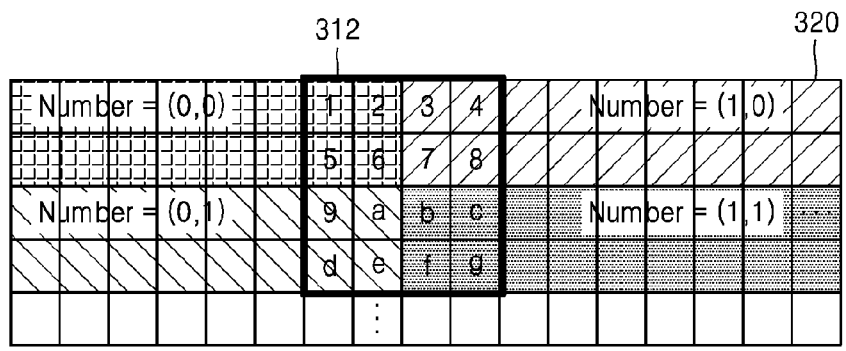

FIG. 3 is a diagram illustrating a data block and the cache memory 24 according to an embodiment.

In detail, FIG. 3 (a) illustrates a one-dimensional cache memory 310, and FIG. 3 (b) illustrates a two-dimensional cache memory 320.

The one-dimensional cache memory 310 indicates that data is either stored in the one-dimensional cache memory 310 or output from the one-dimensional cache memory 310 as a line unit. Referring to FIG. 3 (a), the cache control unit 22 may output data stored in a line corresponding to Number=0 of the one-dimensional cache memory 310, and store data transmitted from the main memory 40 to a line corresponding to Number=0 of the one-dimensional cache memory 310.

Also, the two-dimensional cache memory 320 indicates that data is either stored in the cache memory 320 or output from the two-dimensional cache memory 320 as a block unit. Referring to FIG. 3 (b), the cache control unit 22 may output data stored in a block corresponding to Number=(0, 0) of the two-dimensional cache memory 320, and store data transmitted from the main memory 40 to a block corresponding to Number=(0, 0) of the two-dimensional cache memory 320.

According to an embodiment of the present invention, the processor 10 may perform processing of image data. Here, the processor 10 may perform coding or decoding of data by using data with high similarity. Thus, data requested by the processor 10 or data with high similarity may be stored in a shape of a block 311 or 312 at adjacent locations in the cache memory namely, the one-dimensional cache memory 310 or the two-dimensional cache memory 320 and the processor 10 may request data corresponding to one single block 311 or 312 contained in the cache memory namely, the one-dimensional cache memory 310 or the two-dimensional cache memory 320.

Referring to FIG. 2 again, the location information, which is received by the receiving unit 221 from the processor 10, may indicate information where the location of one piece of data in the cache memory 24 is expressed in coordinates, and the size information may indicate information where the size of the data block is expressed as a matrix. Here, one piece of data is data included in the data block, and may indicate data corresponding to one edge of the data block.

For example, the location information may be expressed as (6, 0) and the size information as 4×4. However, the location information may be applicable without limitation as long as the location information is in a type which may specify the location of data in the cache memory 24. Also, the size information may be applicable without limitation as long as the size information is in a type which may specify the size of the data block.

The mapping unit 222 maps the data block in the cache memory 24 by using the location information and the size information. In detail, the mapping unit 222 calculates the location coordinates of data corresponding to the edge of the data block by using the location information and the size information, which are transmitted from the receiving unit 221. The operation of the mapping unit 222 is described in more detail below with reference to FIG. 4.

Figure 4:
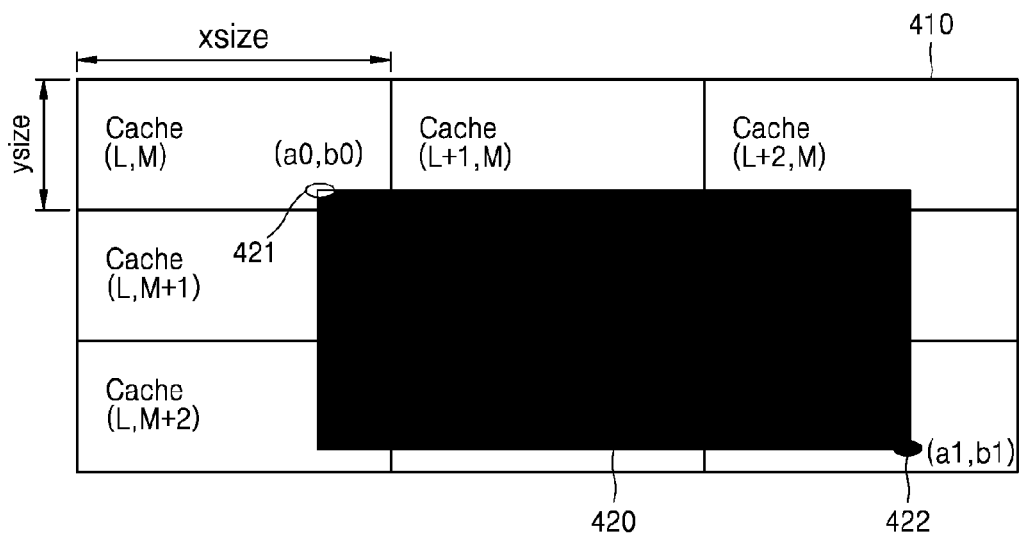
FIG. 4 is a diagram illustrating operations of a mapping unit and a selection unit according to an embodiment.

FIG. 4 is a diagram illustrating operation of the mapping unit 222 and the selection unit 223 according to an embodiment.

Referring to FIG. 4, a portion of the cache memory 24 is illustrated. Here, the cache memory 24 may be one-dimensional cache or two-dimensional cache.

The cache memory 24 may include a plurality of unit caches. In other words, the cache memory 24 may include unit caches from (L, M) to (L+2, M+2). Here, factors, i.e., xsize and ysize, which determine the size of unit caches, i.e., cache(L, M) to cache(L+2, M+2), may be determined in advance depending on the type of the cache memory 244. For example, If the cache memory 24 is assumed to be a one-dimensional cache, it may be determined in advance that ysize is 1 and that xsize is a natural number larger than 2. Also, if the cache memory 24 is assumed to be a two-dimensional cache, it may be determined in advance that both xsize and ysize are natural numbers larger than 1.

The mapping unit 222 calculates the location coordinates (a1, b1) of data corresponding to the edge of a data block 420 by using the location information (a0, b0) and the size information. For example, if it is assumed that the location information is (8, 0) and the size information is 4×4, the mapping unit 222 may calculate the location coordinates (a1, b1) of data corresponding to the edge of the data block 420 as (11, 3).

Referring to FIG. 1 again, the selection unit 223 selects at least one unit cache out of the unit caches included in the cache memory 24. In more detail, the selection unit 223 selects unit caches including the data block 420 out of the unit caches included in the cache memory 24 by using the location coordinates transmitted from the mapping unit 222 and the location information transmitted from the receiving unit 221.

Referring to FIG. 4 again, the selection unit 223 selects unit caches, i.e., from cache(L, M) to cache(L+2, M+2), that respectively have the location coordinates (a1, b1) and the location information (a0, b0) out of the unit caches included in a cache memory 410. In more detail, the selection unit 223 may determine unit caches, i.e., cache(L, M) to cache(L+2, M+2), located at edge points 421, 422 of the data block 420, using mathematical formulas 1 through 4 below.

[Mathematical formula 1]

$$x_{start} = a0/xsize = L$$

[Mathematical formula 2]

$$X_{end} = a1/xsize = L+2$$

[Mathematical formula 3]

$$y_{start} = b0/ysize = M$$

[Mathematical formula 4]

$$y_{end} = b1/ysize = M+2$$

In mathematical formulas 1 and 3, both $x_{start}$ and $y_{start}$ indicate coordinate values of the edge point 421 where first data included in the data block 420 is located in the cache memory. Also, in mathematical formulas 2 and 4, both $x_{end}$ and $y_{end}$ indicate coordinate values of the edge point 422 where the last data included in the data block 420 is located in the cache memory 24.

The selection unit 223 may determine a first unit cache, i.e., cache (L, M), to an $n^{th}$ unit cache, i.e., cache (L+2, M+2), based on formulas 1 through 4 described above. Then, the selection unit 223 selects other remaining unit caches or cache(L+1, M), cache(L+2, M), cache(L, M+1), cache(L+1, M+1), cache(L+2, M+1), cache(L, M+2), and cache(L+1, M+2), which are surrounded by the boundary of the data block 420.

According to the description above, the cache control unit 22 may promptly select unit caches corresponding to the whole data block through mapping the data block of the cache memory 24 based on the location information and the size information transmitted upon request by the processor 10.

Referring to FIG. 1 again, the request unit 224, using data included in selected unit caches, generates a signal requesting transmission of data included in a unit cache where a cache-miss occurs out of the selected unit caches.

In detail, the request unit 224 obtains tag information and index information of the selected unit caches. Then, the request unit 224 determines whether a cache-miss occurs in the selected unit caches by using the obtained tag information and the index information. Then, the request unit 224 generates a signal requesting transmission of data included in a unit cache where a cache-miss occurs based on the determination result.

Figure 6:
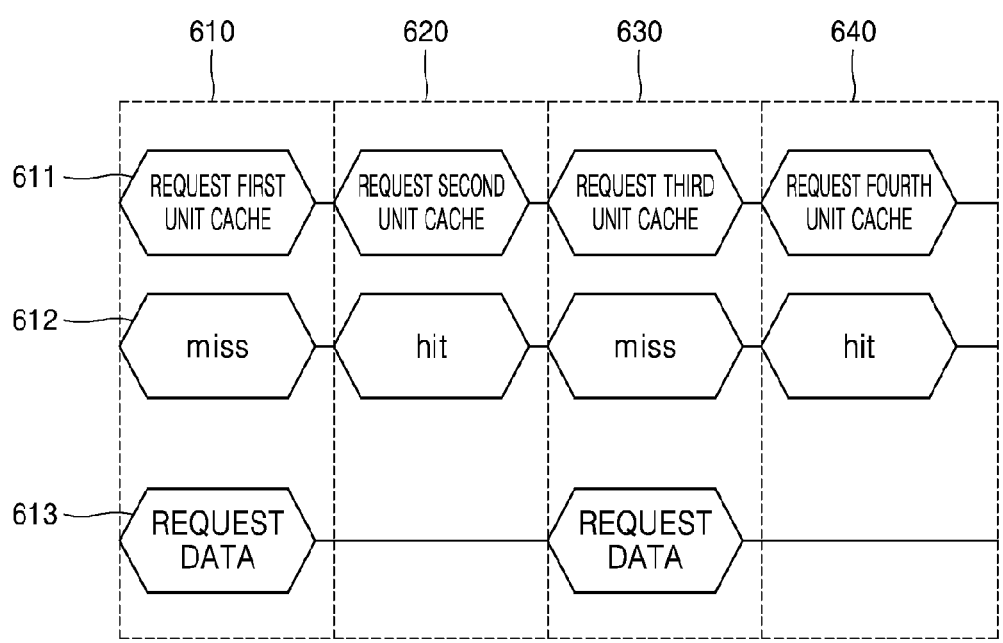
FIG. 6 is a diagram illustrating operations of a request unit according to an embodiment.
Figure 7:
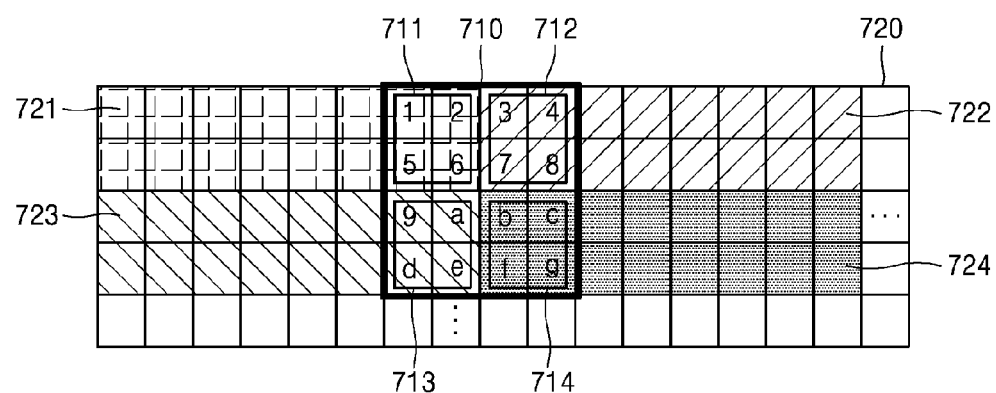
FIG. 7 is a diagram illustrating unit caches and a data block according to another embodiment.
Figure 8:
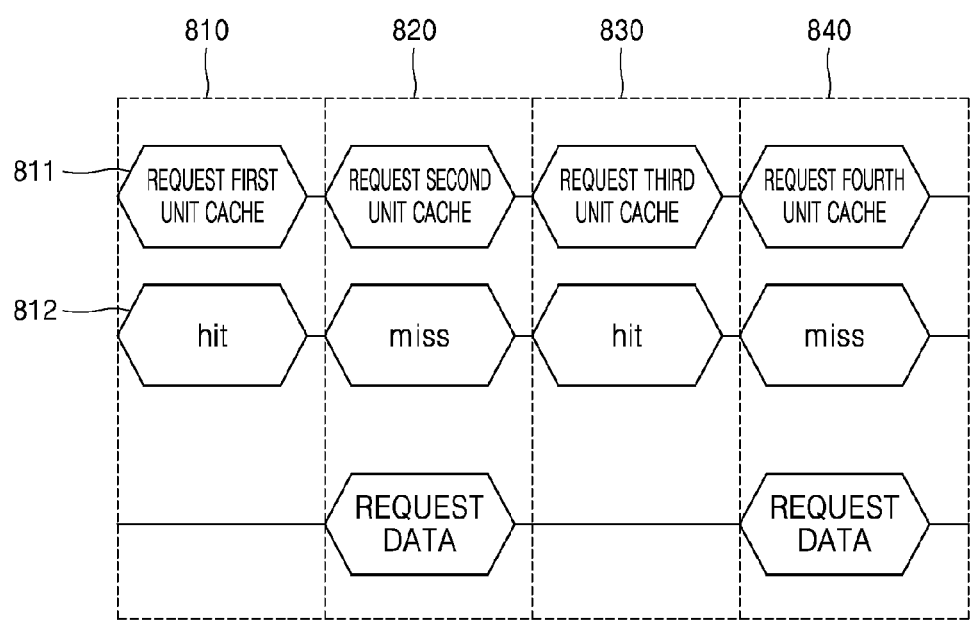
FIG. 8 is a diagram illustrating operations of a request unit according to another embodiment.

Descriptions of operations of the request unit 224 are provided below with reference to FIGS. 5 through 9. In detail, FIGS. 5 and 6 are diagrams illustrating operations of the request unit 224 when the cache memory 24 is a one-dimensional cache according to an embodiment of the present invention, and FIGS. 7 and 8 are diagrams illustrating operations of the request unit 224 when the cache memory 24 is a two-dimensional cache according to an embodiment of the present invention.

Figure 5:
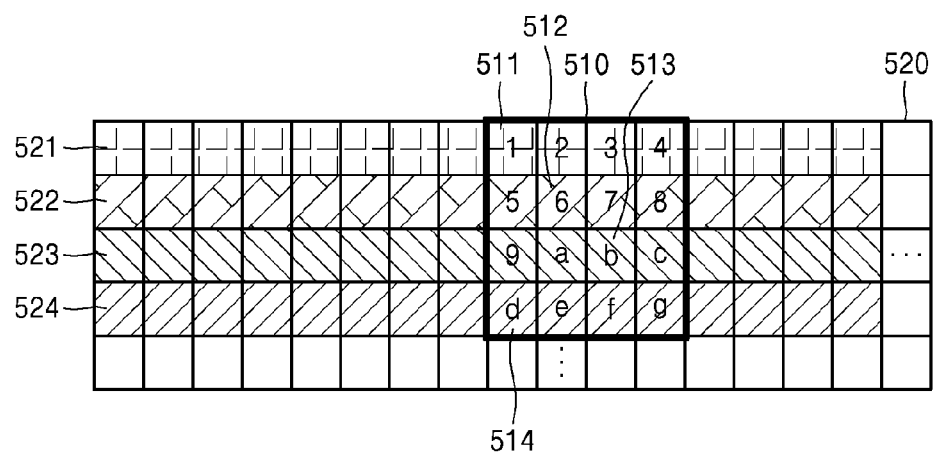
FIG. 5 is a diagram illustrating unit caches and a data block according to an embodiment.

FIG. 5 is a diagram illustrating unit caches and a data block 510 according to an embodiment.

Referring to FIG. 5, an example is illustrated where the data block 510 is mapped onto a one-dimensional cache memory 520. Here, it is assumed that each of the unit caches has a size of 16×1, and the selection unit 223 selects from first unit cache 521 to fourth unit cache 524.

Also, it is assumed that the data block 510 exists over four unit caches, namely, first to fourth unit caches 521, 522, 523, and 524. Here, it is assumed that data 1 through 4 included in the data block 510 are not stored in the first unit cache 521, and data 5 through 8 included in the data block 510 are stored in the second unit cache 522. Also, it is also assumed that data 9 through c included in the data block 510 are not stored in the third unit cache 523, and data d through g included in the data block 510 are stored in the fourth unit cache 524.

The request unit 224 obtains the tag information and the index information of the first unit cache 521 to the fourth unit cache 524. Here, the tag information and the index information indicate information on the location and the size of a unit cache, and the location and the type of data stored in the unit cache.

The request unit 224 determines whether a cache-miss occurs in the first to fourth unit caches 521 through 524 by using the tag information and the index information. In detail, the request unit 224, using the tag information and the index information of each of the first to fourth unit caches 521 through 524, determines for each of unit cache whether data included in the data block 510 is stored in the first to fourth unit caches 521 through 524.

Also, the request unit 224 generates a signal for transmission of data corresponding to a unit cache where a cache-miss occurs based on the determination result. In detail, the request unit 224 generates an individual signal corresponding to each of the unit caches where a cache-miss occurs. Here, the signal generated by the request unit 224 indicates a signal requesting transmission of data from the main memory 40.

For example, the request unit 224, using the tag information and the index information of the first unit cache 521, determines whether a cache-miss or a cache-hit occurs in the first unit cache 521. According to previous assumptions, since data 1 through 4 included in the data block 510 are not stored in the first unit cache 521, the request unit 224 determines that a cache-miss occurs in the first unit cache 521.

Thereafter, the request unit 224 generates a signal requesting transmission of data 1 through 4 corresponding to the first unit cache 521. In other words, since a cache-miss occurs in the first unit cache 521, the request unit 224 generates a signal requesting transmission of data 1 through 4 corresponding to the first unit cache 521.

Thereafter, the request unit 224, using the tag information and the index information of second unit cache 522, determines whether a cache-miss or a cache-hit occurs in the second unit cache 522. According to previous assumptions, since data 5 through 8 included in the data block 510 are stored in the second unit cache 522, the request unit 224 determines that a cache-hit occurs in the second unit cache 522.

Since a cache-hit occurs in the second unit cache 522, the request unit 224 does not generate a signal requesting transmission of data 5 through 8 corresponding to the second unit cache 522.

In the same method described above, the request unit 224 determines whether a cache-miss or a cache-hit occurs in the third unit cache 523 and the fourth unit cache 524, and selectively generates a signal requesting transmission of data.

In detail, the request unit 224 determines that a cache-miss occurs in the third unit cache 523 and generates a signal requesting data 9 through c corresponding to the third unit cache 523. Also, the request unit 224 determines that a cache-hit occurs in the fourth unit cache 524, and does not generate a signal requesting other data.

FIG. 6 is a diagram illustrating operations of the request unit 224 according to an embodiment.

FIG. 6 is a diagram summarizing operations of the request unit 224 per unit cache with reference to FIG. 5. Thus, contents to be described below with reference to FIG. 6 include contents described above with reference to FIG. 5.

The request unit 224 requests 611 transmission of data from the first unit cache 521. The request unit 224 determines 612 whether a cache-miss occurs based on whether data included in a data block is stored in the first unit cache 521. Also, the request unit 224 generates 613 a signal requesting transmission of data included in the data block from the main memory 40 based on the determination result.

The request unit 224 sequentially requests transmission of data from each unit cache, determines whether a cache miss occurs or not, and generates a signal. In other words, the request unit 224 performs processes described above in a sequence: first unit cache 610->second unit cache 620->third unit cache 630-> fourth unit cache 640.

FIG. 7 is a diagram of another example of unit caches and a data block 710 according to another embodiment.

Referring to FIG. 7, an example is illustrated where the data block 710 is mapped onto a two-dimensional cache memory 720. Here, it is assumed that each of unit caches has a size of 8×2, and the selection unit 223 selects first unit cache 721 through fourth unit cache 724.

Also, it is assumed that the data block 710 exists over four unit caches, namely, first to fourth unit caches 721, 722, 723, and 724. Here, it is assumed that data 1, 2, 5, 6 included in the data block 710 are stored in the first unit cache 721, and data 3, 4, 7, 8 included in the data block 710 are not stored in the second unit cache 722. Also, it is also assumed that data 9, a, d, e included in the data block 710 are stored in the third unit cache 723, and data b, c, f, g included in the data block 710 are not stored in the fourth unit cache 724.

The request unit 224 obtains the tag information and the index information of the first unit cache 721 to the fourth unit cache 724. Here, the tag information and the index information indicate information on the location and the size of a unit cache, and the location and the type of data stored in the unit cache.

The request unit 224 determines whether a cache-miss occurs in the first to fourth unit caches 721 through 724 by using the tag information and the index information. In detail, the request unit 224, using the tag information and the index information of each of the first to fourth unit caches 721 through 724, determines for each of the first to fourth unit cache 721 through 724 whether data included in a data block is stored in the first to fourth unit caches 721 through 724.

Also, the request unit generates a signal for transmission of data corresponding to a unit cache where a cache-miss occurs based on the determination result. In detail, the request unit 224 generates an individual signal corresponding to each of the unit caches where a cache-miss occurs. Here, the signal generated by the request unit 224 indicates a signal requesting transmission of data from the main memory 40.

For example, the request unit 224, using the tag information and the index information of the first unit cache 721, determines whether a cache-miss or a cache-hit occurs in the first unit cache 721. According to previous assumptions, since data 1, 2, 5, 6 included in the data block 710 is stored in the first unit cache 721, the request unit 224 determines that a cache-hit occurs in the first unit cache 721.

Since a cache-hit occurs in the first unit cache 721, the request unit 224 does not generate a signal requesting transmission of data 1, 2, 5, 6 corresponding to the first unit cache 721.

Thereafter, the request unit 224, using the tag information and the index information of the second unit cache 722, determines whether a cache-miss or a cache-hit occurs in the second unit cache 722. According to previous assumptions, since data 3, 4, 7, 8 included in the data block 710 is not stored in the second unit cache 721, the request unit 224 determines that a cache-miss occurs in the second unit cache 721.

Thereafter, the request unit 224 generates a signal requesting transmission of data 3, 4, 7, 8 corresponding to the second unit cache 722. Since a cache-miss occurs in the second unit cache 722, the request unit 224 generates a signal requesting transmission of data 3, 4, 7, 8 corresponding to the second unit cache 722.

In the same method described above, the request unit 224 determines whether a cache-miss or a cache-hit occurs in the third unit cache 723 and the fourth unit cache 724, and selectively generates a signal requesting transmission of data.

In detail, the request unit 224 determines that a cache-hit occurs in the third unit cache 723 and does not generate a signal requesting other data. Also, the request unit 224 determines that a cache-miss occurs in the fourth unit cache 724, and generates a signal requesting data b, c, f, g corresponding to the fourth unit cache 724.

FIG. 8 is a diagram illustrating operations of the request unit 224 according to an embodiment.

FIG. 8 is a diagram summarizing operations of the request unit 224 per unit cache with reference to FIG. 7. Thus, contents to be described below with reference to FIG. 8 include contents described above with reference to FIG. 7.

The request unit 224 requests 811 transmission of data to the first unit cache 721. The request unit 224 determines 812 whether a cache-miss occurs based on whether data included in a data block is stored in the first unit cache 721. Since a cache-hit occurs in the first unit cache 721, the request unit 224 does not generate another signal requesting transmission of data from the main memory 40.

The request unit 224 sequentially performs processes of requesting transmission of data to each unit cache, determines whether a cache-miss occurs or not, and generates a signal. In other words, the request unit 224 performs processes described above in a sequence: first unit cache 810->second unit cache 820-> third unit cache 830-> fourth unit cache 840.

Figure 9:
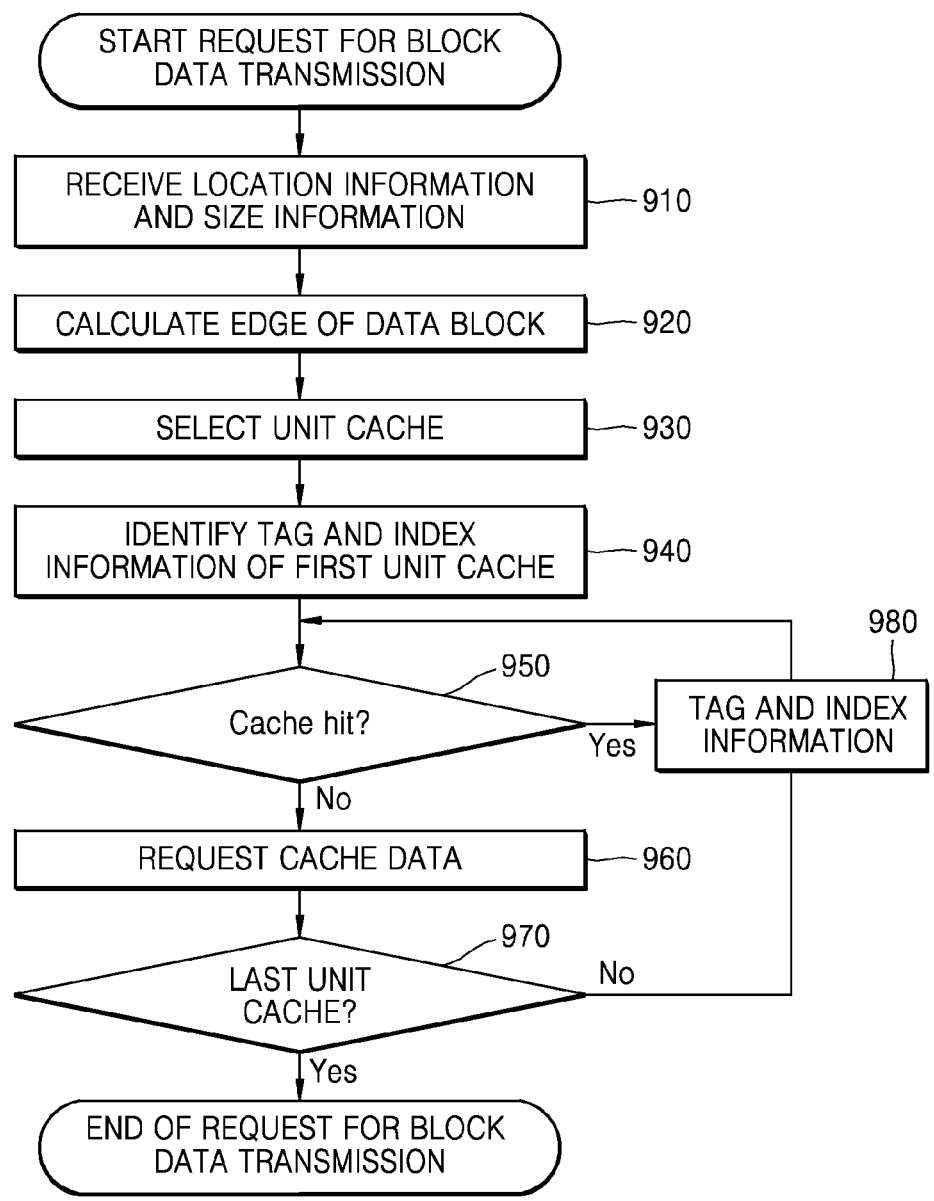
FIG. 9 is a flowchart illustrating operations of a cache control unit, according to an embodiment.

FIG. 9 is a flowchart illustrating operations of a cache control unit 22 according to an embodiment.

Referring to FIG. 9, descriptions provided above with reference to FIGS. 2 through 8 also apply to descriptions of operations of the cache control unit 22. Thus, description provided above with reference to FIGS. 2 through 8, though omitted, apply to operations of the cache control unit 22 of FIG. 9.

In operation 910, the receiving unit 221 receives location information of data included in a data block and size information of the data block.

In operation 920, the mapping unit 222 calculates location coordinates of data corresponding to the edge of the data block.

In operation 930, the selection unit 223 selects unit caches based on the mapping result of the mapping unit 222.

In operation 940, the request unit 224 verifies the tag information and the index information of a first unit cache.

In operation 950, the request unit 224 determines whether a cache-miss or a cache-hit occurs in the first unit cache. If a cache-hit occurs, operation 980 is performed; otherwise, if a cache-miss occurs, operation 960 is performed.

In operation 960, the request unit 224 requests transmission of data included in the data block from the main memory 40.

In operation 970, the request unit 224 determines whether the operation for a last unit cache is ended. In other words, the request unit 224 determines whether a unit cache other than the first unit cache is selected by the selection unit 223. If another unit cache exists, operation 980 is performed; otherwise, if another unit cache does not exist, the operation is ended.

In operation 980, the request unit 224 updates the tag information and the index information. In other words, the request unit 224, after updating the tag information and the index information, performs operations 950 through 970 for a second unit cache.

According to the description above, the cache control unit 22 minimizes the overhead due to a delay in data transmission from the main memory 40 by storing data required by the processor 10 in the cache memory 24 in advance before the processor 10 accesses data included in the cache memory 24.

Figure 10:
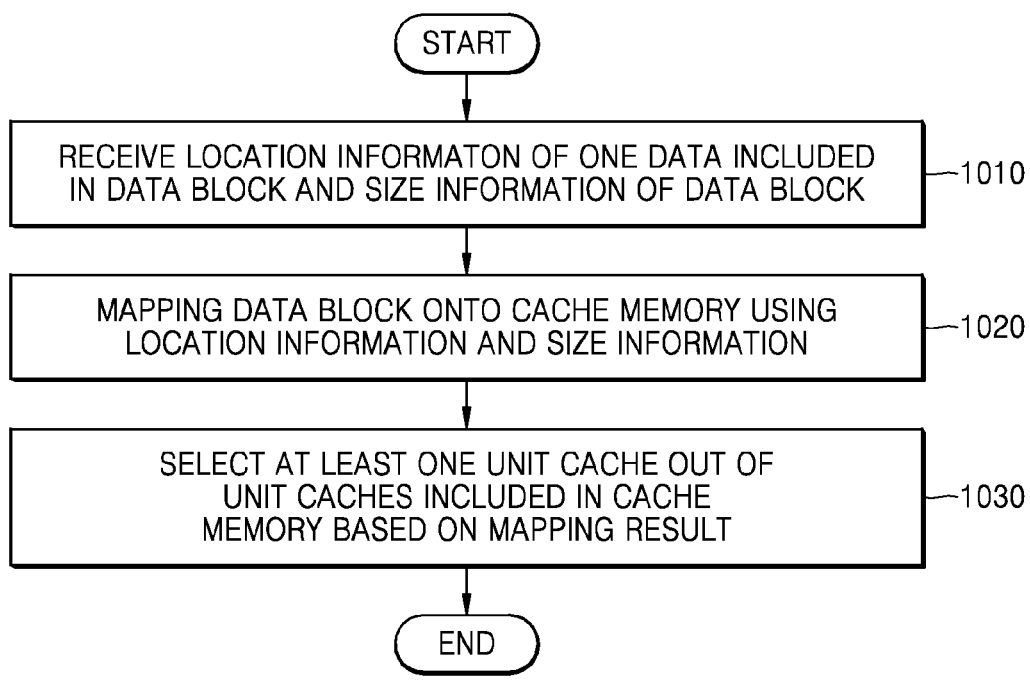
FIG. 10 is a flowchart of a method of controlling a cache memory, according to an embodiment.

FIG. 10 is a flowchart of a method of controlling the cache memory 24, according to an embodiment.

Referring to FIG. 10, the method of controlling the cache memory 24 includes operations which are performed in a time series in an apparatus to control data or in the cache control unit 22 illustrated in FIGS. 1 through 2. Thus, descriptions provided above of the apparatus to control data and the cache control unit 22 illustrated in FIGS. 1 through 2, though omitted, apply to the method of controlling the cache memory 24 in FIG. 10.

In operation 1010, the receiving unit 221 receives location information of one piece of data included in a data block and size information of the data block.

In operation 1020, the mapping unit 222 maps the data block onto the cache memory 24 by using the location information and the size information.

In operation 1030, the selection unit 223 selects at least one unit cache out of unit caches included in the cache memory 24 based on the mapping result.

As described above, according to the one or more of the above embodiments of the present invention, overhead due to a delay in data transmission from a main memory may be minimized by storing data needed by a processor in a cache memory in advance before the processor accesses data contained in the cache memory. Also, in video image processing, a time for processing images may be reduced and coding and decoding of data may be performed faster.

In addition, other embodiments of the present invention can also be implemented through computer-readable code/instructions in/on a medium, e.g., a computer-readable recording medium, to control at least one processing element to implement any above-described embodiment. The computer-readable recording medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, RAM, USB, floppy disks, hard disks, etc.) and optical recording media (e.g., CD-ROMs or DVDs).

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of controlling a cache memory, the method comprising:
   receiving location information of data included in a data block corresponding to at least two unit caches among unit caches included in the cache memory and size information of the data block;
   mapping the data block onto the at least two unit caches in the cache memory by using the location information and the size information;

selecting the at least two unit caches from the unit caches included in the cache memory based on the mapping result; and classifying the selected at least two unit caches into at least one first unit cache where a cache-hit occurs and at least one second unit cache where a cache-miss occurs.

2. The method of claim 1, further comprising
generating a request signal to a memory requesting transmission of the data corresponding to the at least one second unit cache by using information for the data included in the at least one second unit cache.

3. The method of claim 2, wherein the generating comprises:

obtaining tag information and index information of the at least one second unit cache; and generating the request signal based on the tag information and index information.

4. The method of claim 3, wherein the generating comprises determining whether the data included in the data block exists in the at least one second unit cache by using the tag information and the index information for each of the at least one second unit cache, and the generating comprises generating the request signal for the transmission of the data in correspondence to the at least one second unit cache.

5. The method of claim 1, wherein the mapping comprises calculating location coordinates of data corresponding to an edge of the data block by using the location information and the index information, and the selecting comprises selecting the at least two unit caches including the data block among the unit caches included in the cache memory by using the calculated location coordinates and the location information.

6. The method of claim 1, wherein the location information includes information where a location of the data in the cache memory is expressed in coordinates, and the size information includes information where a size of the data block is expressed as a matrix.

7. The method of claim 1, wherein the cache memory includes either one-dimensional line cache or two-dimensional block cache.

8. A non-transitory computer-readable recording medium having recorded thereon a program for executing the method of claim 1.

9. An apparatus to control a cache memory, the apparatus comprising:

a memory; and a processor configured to:

receive location information of data included in a data block corresponding to at least two unit caches among unit caches included in the cache memory and size information of the data block;

map the data block onto the at least two unit caches in the cache memory by using the location information and the size information;

select the at least two unit caches from the unit caches included in the cache memory based on the mapping result; and classify the selected at least two unit caches into at least one first unit cache where a cache-hit occurs and at least one second unit cache where a cache-miss occurs.

10. The apparatus of claim 9, the processor is further configured to generate a request signal to a memory requesting transmission of the data corresponding to the at least one second unit cache by using information for the data included in the at least one second unit cache.

11. The apparatus of claim 10, wherein the processor obtains tag information and index information for each of the at least one second unit cache, and generates the request signal based on the tag information and index information.

12. The apparatus of claim 11, wherein the processor determines for the at least one second unit cache whether the data included in the data block exists in the at least one second unit cache by using the tag information and the index information for the at least one second unit cache, and generates the request signal for the transmission of the data in correspondence to the at least one second unit cache.

13. The apparatus of claim 9, wherein the processor calculates location coordinates of data corresponding to an edge of the data block by using the location information and the size information, and the processor selects the at least two unit caches including the data block among the unit caches included in the cache memory by using the calculated location coordinates and the location information.

14. The apparatus of claim 9, wherein the location information includes information where the location of the one piece of data in the cache memory is expressed in coordinates, and the size information includes information where the size of the data block is expressed as a matrix.

15. The apparatus of claim 9, wherein the cache memory includes either one-dimensional line cache or two-dimensional block cache.

16. The apparatus of claim 9, wherein the data block includes data that the processor requests to be transmitted.

* * * * *